United States Patent [19]

Goray et al.

[11] Patent Number: 4,731,839

[45] Date of Patent: Mar. 15, 1988

[54] METHOD FOR CODING AND DE-CODING AUDIO AND VIDEO INFORMATION

[75] Inventors: Eddy C. Goray; Pierre J. Joris; Jean-Claude S. Nelen, all of Brussels, Belgium

[73] Assignee: Radio-Television Beige de la Communaute Francaise, Brussels, Belgium

[21] Appl. No.: 816,635

[22] Filed: Jan. 6, 1986

[30] Foreign Application Priority Data

Jan. 9, 1985 [BE] Belgium .................................. 214310

[51] Int. Cl.[4] .................... H04N 7/167; H04L 9/00
[52] U.S. Cl. .................................... 380/14; 380/19; 380/36
[58] Field of Search ........................... 358/119, 123; 178/22.04; 380/14, 19, 36

[56] References Cited

U.S. PATENT DOCUMENTS

| | | |
|---|---|---|
| 4,070,693 | 1/1978 | Shutterly . |
| 4,221,931 | 9/1980 | Seiler ............................ 178/22.04 |
| 4,443,660 | 4/1984 | DeLong ........................ 178/22.04 |
| 4,533,949 | 8/1985 | Fujimura et al. ............... 358/119 |
| 4,575,754 | 3/1986 | Bar-Zohar .................... 358/119 |
| 4,604,650 | 8/1986 | DelCoco et al. .............. 358/119 |
| 4,605,961 | 8/1986 | Frederiksen ................. 358/119 |

FOREIGN PATENT DOCUMENTS 0018783 12/1980 European Pat. Off. .
1590579 6/1981 United Kingdom .

Primary Examiner—Stephen C. Buczinski
Attorney, Agent, or Firm—Cushman, Darby & Cushman

[57] ABSTRACT

There is described a method for coding and de-coding in an information-transmission system, particularly for pay-television, which comprises for coding, converting the input analog signal into a digital signal, treating said latter digital signal to impart thereto a form which makes the information content thereof unintelligible for normal receiving circuits, converting said signal back to an analog signal for transmitting same, and for receiving and de-coding, converting the input analog coded signal into a digital signal, treating said digital signal to return same to a form which makes said information content intelligible for normal receiving circuits, and finally converting the treated signal back to analog form for the use thereof. There is further described an apparatus for the working of this method.

18 Claims, 4 Drawing Figures

METHOD FOR CODING AND DE-CODING AUDIO AND VIDEO INFORMATION

This invention relates to a method for coding and de-coding in an information-transmission system, particular for pay-television.

The development of communications has reached such a scale as to make imperative in some cases, the requirement for insuring information privacy by jamming the signal being sent while retaining the analog features thereof. This is, notably the case when it is desired to obtain a payment in the information being provided, that is for example for "pay"-television.

The invention has for object to provide a method allowing to insure such privacy with high reliability and this by making use of low-cost high-technology components.

For this purpose according to the invention, said method comprises for coding, converting the input analog signal into a digital signal, treating said latter digital signal to impart thereto a form which makes the information content thereof unintelligible for normal receiving circuits, converting said signal back to an analog signal for transmitting same, and for receiving and de-coding, converting the input analog coded signal into a digital signal, treating said digital signal to return same to a form which makes said information content intelligible for normal receiving circuits, and finally converting the treated signal back to analog form for the use thereof.

In one embodiment of the invention, the informations being treated are comprised of video informations.

In an advantageous embodiment of the invention, the informations being treated are comprised of video and audio informations.

The jammed signals being transmitted completely fulfill the television standards and do not require any change in the transmitting means.

The jamming efficiency as regards viewing is complete, the jammed picture being similar to noise, while when the audio signals are jammed together with the video signals, the jammed sound is similar to the sound given by a magnetic tape being played-back in the opposite direction to the normal working.

The protection against piracy is dependent on the algorithms begin used. the use of simple algorithms may however prove to be very efficient. Such a system requires specific data being transmitted to allow synchronizing the operations in the transmitter and the receiver.

The main drawback known up to now for this system which is perfect in principle, lies in the high cost thereof. Indeed this kind of jamming resorts to high-technology components, such as fast analog/digital and digital/analog converters and fast random-access memories (RAM).

The invention has also for object an apparatus for the working of said method.

Other details and features of the invention will stand out from the following description, given by way of non limitative example and with reference to the accompanying drawings, in which.

The invention has a purpose to allow making use of converting into digital signals either an analog video signal, or analog video and audio signals, the privacy of which should be insured. The conversion to the digital form to perform a coding and de-coding provides for a very high security, but was impossible to use up to now in "consumer" embodiments, due to a very high cost.

There has however recently been made available in the television art, integrated circuit sets for digital treatment of the signals in a television receiver for example. Such sets allow from one or a plurality of analog signals, converting to digital form, suitable signal treatment and thereafter converting back to analog form to provide upstream and downstream of said circuits, the conventional analog signal or signals.

Figure 1:
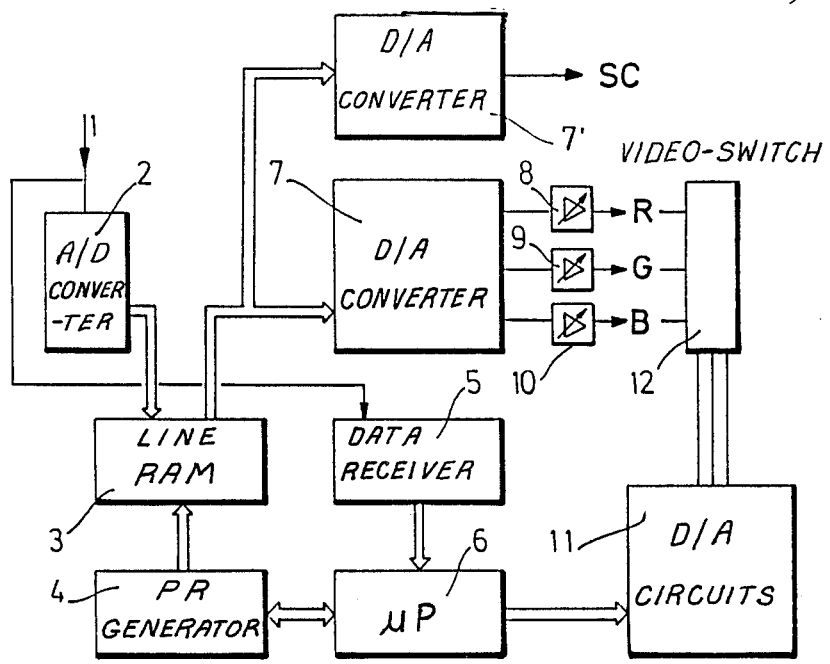
FIG. 1 is a block diagram showing the method according to the invention is applied to the video informations being required for pay-television.

According to the invention and as shown in FIG. 1, the method for coding and de-coding video informations, particularly for a pay-television system, lies in locating a circuit in the normal path of the digital signals. Assuming that the block diagram shown in FIG. 1, shows part of a television receiver the composite video signal is fed to an analog-digital converter 1, the digital signals being obtained therefrom to feed same to a line memory 3 associated with a pseudo-random sequence generator 4. The digital data which correspond to each video picture line are thus first stored according to the input sequence thereof in line memory 3. When this is a so-called "pay-television" signal, said signal has been coded for transmitting and the data stored in memory 3 do not allow obtaining directly a signal which is intelligible for the further circuits in the television receiver. To de-code the signal the stored data stand for, the pseudo-random sequence generator 4 controls a read sequence in memory 3 which corresponds to that sequence which has been followed in the television transmitter. The result of such reading is thus a succession of digital data which stand again for the original video signal in the intelligible form thereof, which is fed to the digital-treatment circuits and to a digital-analog converter as shown by block 7 in FIG. 1 and which is part of those digital circuits which are normally provided in the television receiver. At the output from the digital-analog converter in block 7, the signals R, G and B are obtained, which are respectively fed to amplifiers 8, 9 and 10 to be displayed on the receiver display means. It is also possible to provide as shown in FIG. 1, a decoder which comprises a digital-analog converter 7' which provides at the output therefrom, a composite video signal which is suitable for any apparatus with composite video input such as a tape recorder, or a television receiver.

It will be clear that to perform coding, an identical process is being followed to the exception that the memory is being fed as input signal, the original intelligible video signal which is read-out under the control of a psuedo-random sequence generator with as reading output, the transposed signal which has thus become unintelligible, and which will be converted back to analog form to be transmitted by a conventional television transmitter.

To allow de-coding, the method has to resort to identical pseudo-random sequence generators for coding and de-coding, such identity meaning one and the same polynomial, one and the same initializing word, and one and the same synchronizing clock. It is thus necessary to transmit a series data (intiliazing word) to the pseudo-random sequence generator in a receiver.

For this purpose said data are transmitted together with the video signal to the receiver and in said receiver as shown in FIG. 1, the composite video signal fed in 1 is diverted before the analog-digital converting thereof, to couple said signal to a receiver 5 for such special data. Said receiver 5 isolates said data from the input signal and feeds same to a microprocessor 6 which insures initializing of the pseudo-random sequence generator 4.

The presence of said transmission path further possibly allows to send to the receiver, additional informations which will be treated by the microprocessor 6 to be applied to treatment and digital-analog converting circuits 11, to be coupled to a video switch 12 which also receives the signals from said amplifiers 8, 9, 10. By means of said switch 12, it is thus possible to either display the signals originating from said latter amplifiers, or to display the signals originating from the circuits 11, or else to superimpose said signals on one another. The output from video switch 12 is thus fed to the receiver display circuits and means, such as a cathode-ray tube.

Figure 2:
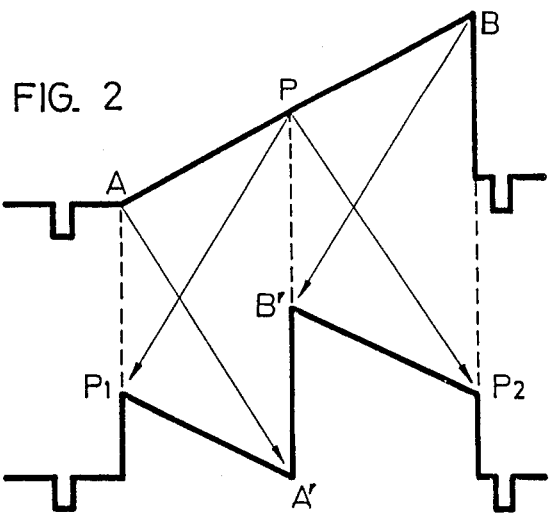
FIG. 2 is a diagram showing a possible application of the coding method to a television video signal according to the invention.

The principle of video information coding will now be further described, as well as a particular embodiment thereof as shown in FIG. 2.

Such principle is based on the possibility to store a complete video line as digital data.

The coding, that is converting the analog video signal will only be dependent on the way the stored digital data are read-out in the memory before being converted back to analog form for the transmitting thereof.

The read-out sequence ends in the transformation and this sequence may be determined by a succession of values provided by a psuedo-random generator. Said latter generator may provide a different value succession for each stored line.

The simplest case of such a coding is a read-out in the direction opposite to the writing direction in the memory, the starting address for reading then corresponding to the last writing address (last digital data from the video line), the reading-out counter then being decremented each time the memory is read-out.

The coding resulting from such reading-out is a time-reversal of the analog signal. In such a case, the psuedo-random generator will be used to determine which lines are being reversed or not in each frame.

The system may even make use, when this is desired, of a different jamming for each line, which jamming will for example be selected in a pseudo-random way. This requires two types of values being provided by the generator, the one value defining the coding type for each video line, and the other one defining the address or address succession for reading-out the memory for each line.

With reference to FIG. 2, there will now be described a specific coding case comprised of a double reversal, wherewith that video line extending from A to B is divided into two parts by a point P which is defined in a pseudo-random way, those line parts AP and PB lying on either side of point B, then being reversed while remaining in the respective locations thereof. Thus after reading-out, segment AP becomes segment $P_1A'$ and segment PB becomes segment $P_2B'$.

There is no permutation of line parts and there is obtained a very efficient viewing jamming.

Such a coding type requires a double line memory 3, the first one for writing and the second one for reading-out. Indeed in this example, it is necessary to wait for the complete storing of the current line, to perform the time restoration. The memory thus being full when the de-coding treatment begins, it is unavoidable to write the following line in another memory, while that line which has previously been stored, is being read-out, whereby it is necessary to direct the data to said second memory, the reading end then corresponding to the coming of a new line which may again be written in the first memory while the second memory is being read-out, and so on.

If for pay-television, it is already of great interest to reliably code and de-code video information, it is clear that it is better to also code and de-code the audio informations together with the video information, and this to avoid obtaining such audio information without any system allowing de-coding.

To jam audio information, it is possible to use either an analog system, such as reversing the spectrum or superimposing to the original signal a low-frequency sinusoidal signal (humming), which is very unreliable against piracy, or a digital system which resorts to converting the analog signals into digital signals, said latter signals then being jammed before converting back to analog signals for transmitting.

As for video information, the main drawback of such digital system lies in the high cost thereof, out of proportion for the conventional use of pay-television, and which is due to the use of fast analog-digital and digital-analog converters and fast random-access memories (RAM).

There has already been considered for jamming, to transmit the audio information in digital form either in the vertical and horizontal blanking time interval, or in a discrete transmission channel. However this transmission process has the main drawback that the transmitted signals are not congruent with television standards and require thereby a change in the transmitting means, which is undesirable, or the use of additional means besides the conventional transmitting means.

As for the coding and de-coding of video information, the method according to the invention resorts for coding and de-coding audio information, to an integrated circuit set for treating the signals, notably known for a television receiver, which allows from an analog signal, converting to digital form, which converting is followed by a suitable treatment of the digital signal, and converting back to analog form to have a conventional analog signal available upstream and downstream of said circuits.

In the method according to the invention, provision is made for audio coding and de-coding, for working according to the above defined principles for coding and de-coding the video signal, that is converting the analog audio signal to a digital signal, coding said latter digital signal, and converting the signal back to an analog signal for the transmitting thereof.

Figure 3:
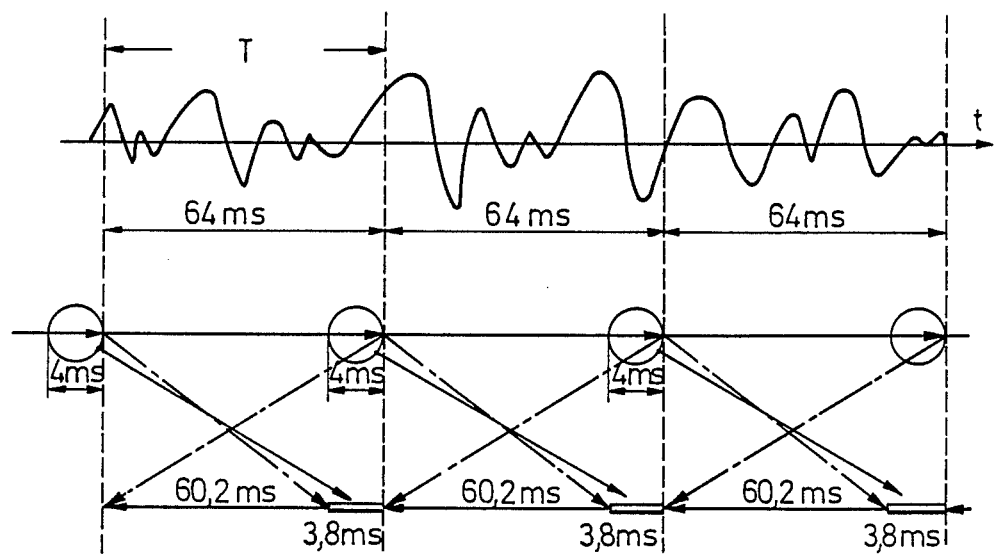
FIG. 3 is a diagram showing a possible embodiment for coding the audio signal as synchronized with the video signal.

To avoid the distortions which generally result from manipulations performed on a digital audio signal, the method according to the invention provides for the coding of said audio signal as shown in FIG. 3 and after converting the analog signal to digital signal, for defining a base time period, for example a period T, which is selected according to a compromise between the jamming quality and the cost resulting from the memory number. The longer period T is and better the jamming is, but due to the memory costs, it is of interest to limit as a good compromise, T to 64 milliseconds (ms). Said period T having been selected, the signal in the form of digital data is virtually cut according to said period, into identical slices which correspond to T in the example as shown. The information order in each slice is then transposed, the transposed informations from each slice are compressed together with a fraction from the directly adjacent slices, and the treated digital data are converted back to an analog signal for transmitting, the information supplement included in each slice due to compressing said informations, is used to allow recovering completely the informations at the boundaries from each slice, during de-coding. To obtain said information compressing during coding, the informations which have been transposed by reversing, are succeedingly written at a rate $v_1$ and read-out at a rate $v_2$ which is higher than $v_1$. When de-coding, the process is naturally reversed. The informations are succeedingly written to rate $v_2$ and they are read-out to lower rate $v_1$, which allows expanding in time the signal with a ratio which accurately corresponds to the compression made when coding.

For working the method according to the invention, as regards coding and de-coding audio information, the analog audio signal is fed to a converting circuit through an impedance-matching operational amplifier. The digital signal at the output from said converting circuit, is fed to a series-parallel converter which feeds the memories. Said memories as for jamming the video signal, are provided in a large enough number to allow for simultaneously writing and reading the audio signal, the only difference lying as stated hereinabove, in the rate changes for writing and reading-out which insure said time compressing and expanding.

Figure 4:
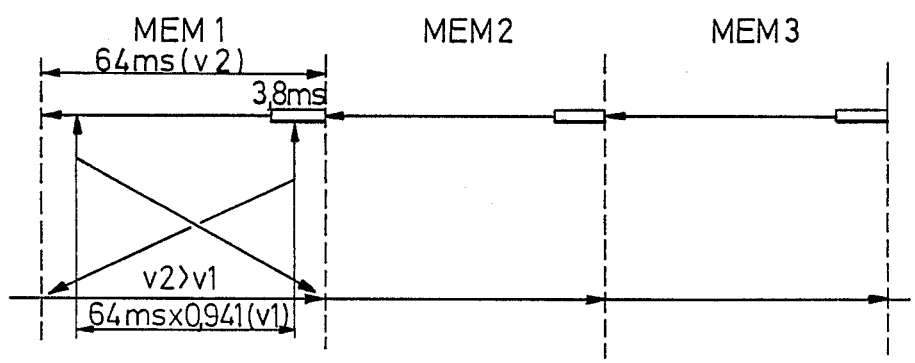
FIG. 4 is a diagram showing the de-coding of the audio informations which have been coded as shown in FIG. 3.

The ratio between said rates defines the compression rate being used, which is 0.941 in the case as shown in FIGS. 3 and 4. Such compression rate may naturally be changed simply by changing the circuit clock, as long as said rate lies within the limits defined by the circuit characteristics and the bandwidth which is available for transmitting the signal.

Taking into account the time compression of the audio signal as defined hereinabove and due to the reversing of the audio informations possibly causing severe transitions which will be down-graded during transmitting, the selection of a compression rate of 0.941 and a period T of 64 ms as shown in FIG. 3, gives a new compressed period of 60 ms which allows using the remaining 4 ms, that is about 3.8 ms after compressing, to send informations corresponding to the end of the previous period.

For a good synchronizing of the audio de-coder, the coder records the condition of the memory address counters in the coder which corresponds to the coming of the video signal vertical synchronizing pulse. The condition of said counters is coupled to the decoder to have same adjust the counters thereof to the same condition, while taking of course into account that time interval corresponding to two frames (40 ms) which lies between the coder recording and the decoder adjustment.

The treatments undergone by the sound do delay same relative to the picture and consequently the video signal is subjected to a corresponding delay before converting back to an analog form.

The decoder process being opposite to the coder process, the received analog signal is converted to a digital signal to be then written as shown in FIG. 4, in memory 1 (MEM 1) to a rate $v_2$, stored in memory 2 (MEM 2) to be read-out therefrom at the rate $v_1$ slower than $v_2$ to obtain a time expanding corresponding to the time compressing performed when coding. As shown in FIG. 4, reading-out begins at the address pre-determined in the decoder by wiring and which approximately corresponds to half the period of 3.8 ms (compressed 4 ms period).

The decrementing (reading+expanding) starting at said address lasts for 64 ms, that is period T, which results in keeping part of the informations beyond said 64 ms unused.

It is to be noted that when the travelling times for video (signal vertical synchronizing pulses) and audio are different, notably due to the transmission modes for both signals, the system is not disturbed when de-coding within a margin of 3.8/2 ms.

In the case where the method according to the invention is being applied to a so called "pay-television" system, the de-coding method may be worked in different ways at the receiving end.

First of all, there may be considered that case where the television receivers already comprise a treatment in digital form either of the video information, or of the video and audio informations being transmitted, it is then possible to incorporate therein a de-coding module with the required circuits for the working of the de-coding method, such module being cut-in after the receiver analog-digital conversion stage.

When the pertaining television receivers do not include such a treatment in digital form of the informations, but do not have an output and an input for the signals which are normally intended for connecting a tape recorder, it is possible to design a decoder comprising a digital treatment system for the input analog signal, wherein a decoder module is cut-in after the system analog-digital converting stage, while the digital-analog stage output is coupled to the receiver video input.

Finally when the television receiver does not comprise either a treatment in digital form, nor input/output for the video signal, the decoder apparatus will comprise the required receiving circuits for the incident television signal originating from the aerial or a cable network, the output of which will be coupled to the digital treatment system for the analog signal, wherein the decoder module is cut-in for the working of the method according to the invention, and the digital-analog converting stage of which is conencted to converting means allowing to provide the receiver with that incident signal the receiver has been designed for.

It is clear from the above description that it is possible to use for the working of the method according to the invention, any circuit set which insures an analog-digital converting, followed by converting back to analog form. An example of such a digital circuit set is the set intended for developing a "consumer" television receiver with digital treatment of the video signal and audio signal, as manufactured by the firm ITT Intermail in Freiburg, German Federal Republic, under the name "System Digit 2000".

We claim:

1. A method for coding and de-coding information comprised of video and audio information in an information-transmission system, particularly for pay-television, comprising the steps of:

for coding:
(a) converting an input analog signal which includes said information into a digital signal,
(b) treating said digital signal to produce a treated digital signal of a form which makes the information content thereof unintelligible to normal receiving circuits by: (1) defining a base time period according to which said audio information in the form of digital data is cut into identical slices, (2) transposing an order of the information in each slice, and (3) compressing the transposed information in each slice together with a fraction from the directly adjacent slices, and
(c) converting said treated digital signal to a transmit analog signal to transmit same; and for receiving and de-coding:
(a) receiving an input analog coded signal and converting the input analog coded signal into a coded digital signal,
(b) treating said coded digital signal to form a treated digital signal of a form with an information content which is intelligible for normal receiving circuits, and
(c) finally converting the treated signal back to analog form for the use thereof.

2. Method as defined in claim 1, in which the information being treated is comprised of video information.

3. Method as defined in claim 2, wherein said steps for coding video information comprise the further steps of: storing at least part of the information from each video line in the form of digital data, reading-out said stored data according to a reading sequence which is determined by a succession of values provided by a pseudo-random generator, and converting the data being read-out and transposed according to said sequence back to an analog signal.

4. Method as defined in claim 1, which further comprises using excess iformation obtained in each slice due to said compressing, to insure a complete information recovery at the boundaries of each slice when decoding by duplicating said information recovery at said boundaries.

5. Method as claimed in claim 1, wherein said steps for coding comprise the further steps of:
succeedingly writing the transposed information at a determined rate and reading-out said stored informations to a higher rate to obtain said compression, and said step for decoding comprises the steps of succeedingly writing the information to said higher rate and reading-out same to said determined rate to obtain a time expansion of the signal with a ratio corresponding to said compressing for coding.

6. Method as defined in claim 1, wherein said steps for coding audio informations includes: succeedingly writing at least part of the information from each said slice in the form of the digital data, reading-out said stored data according to a reading sequence which is determined by a value succession provided by a pseudo-random generator, and converting the data being read-out and transposed according to said sequence back to an analog signal.

7. Method as defined in claim 3, wherein said steps for de-coding further comprise, reading-out the input analog signal as converted to digital form according to a reading sequence which is determined by a value succession provided by a pseudo-random generator identical to that generator being used for coding, and converting the data being read and transposed back to the original form thereof, back to an analog signal.

8. Method as defined in claim 7, which further comprises using for coding and de-coding, pseudo-random generators having the same polynomial, the same initializing word, and the same synchronizing clock.

9. Method as defined in claim 8, which further comprises including among the coded data being transmitted, an information pertaining to the initializing word for the pseudo random generators, said information being transmitted directly in coded form to the de-coding psuedo-random generator.

10. Method as defined in claim 7, which further comprises determining by means of the value succession being provided by the pseudo-random generator and for part from each information slice, whether the reading sequence is being transposed or not.

11. Method as defined in claim 10, which further comprises a second pair of pseudo-random generators for making said determining.

12. Method as defined in claim 1, which further comprises for treating the input signal, storing alternately succeeding information groups with the same length in at least two discrete memories, to thus allow treating the content of the one memory while the other memory is receiving following information groups.

13. Method as defined in claim 7, which further comprises in the same way as for the initializing word, transmitting uncoded additional informations, said latter informations being used directly at the receiving end.

14. Method as defined in claim 13, which further comprises using said additional informations together or alternately with the de-coded informations.

15. Method as defined in claim 1, which further comprises when reading-out stored digital data, determining in a pseudo-random way, a point in time on either side of which the reading-out is performed in the opposite direction to the original storing succession of the data.

16. Television receiver comprising the treatment in digital form of the information being transmitted, which comprises a de-coding module working with the de-coding method according to claim 1, said module being cut-in after the receiver analog-digital converting stage.

17. Decoder apparatus working with the de-coding method as defined in claim 1, which comprises a system for digitally treating an input analog signal, wherein a decoder module is cut-in after the system analog-digital converting stage.

18. Apparatus as defined in claim 17, which further comprises converting means allowing to provide a receiver with that incident signal said receiver has been designed for.

* * * * *